April 29, 1958 J. S. FOSTER 2,832,936
ELECTROMAGNETIC ENERGY PHASE SHIFTING DEVICE
Filed March 26, 1946 6 Sheets-Sheet 1
FIG. I
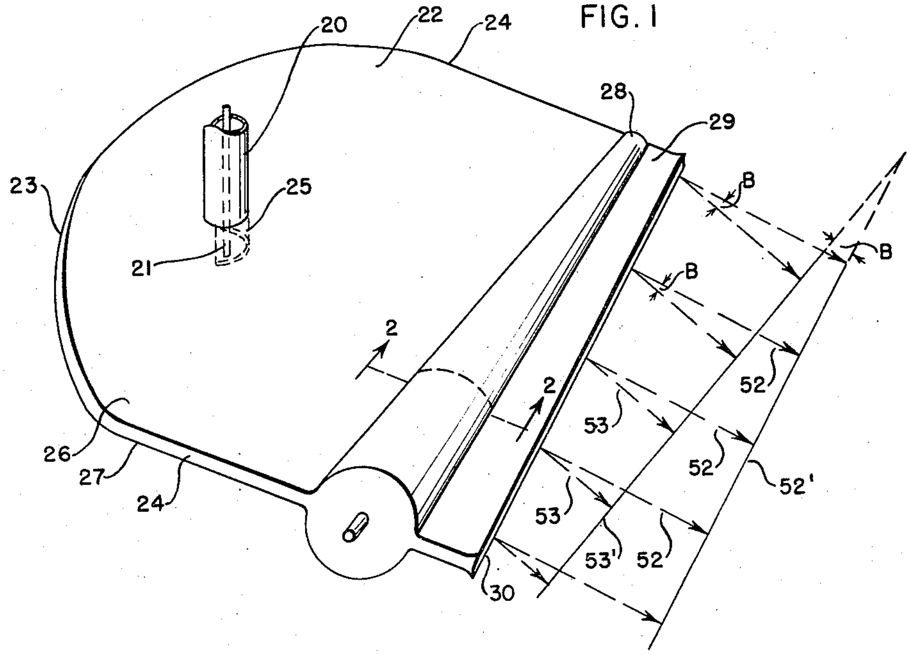
FIG. 2
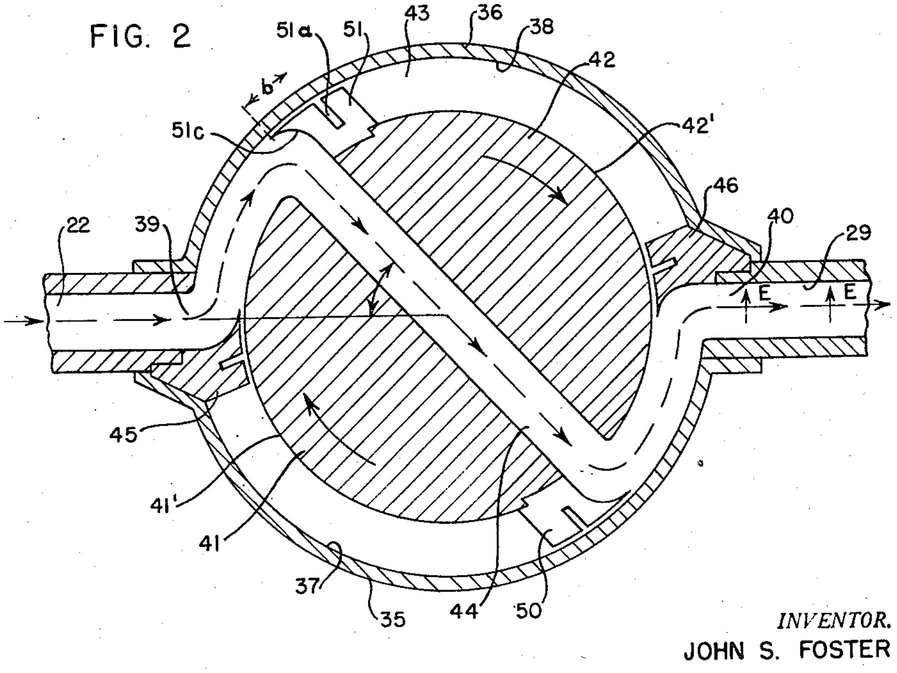
INVENTOR.
JOHN S. FOSTER
BY
William D. Hall
ATTORNEY April 29, 1958 J. S. FOSTER 2,832,936

ELECTROMAGNETIC ENERGY PHASE SHIFTING DEVICE

Filed March 26, 1946 6 Sheets-Sheet 2

INVENTOR.
JOHN S. FOSTER

BY

William D. Hall
ATTORNEY

ELECTROMAGNETIC ENERGY PHASE SHIFTING DEVICE

Filed March 26, 1946 6 Sheets-Sheet 3

INVENTOR.
JOHN S. FOSTER

BY

William D. Hall,
ATTORNEY

INVENTOR.
JOHN S. FOSTER
BY
William D. Hall
ATTORNEY

April 29, 1958 J. S. FOSTER 2,832,936

ELECTROMAGNETIC ENERGY PHASE SHIFTING DEVICE

Filed March 26, 1946 6 Sheets-Sheet 5

INVENTOR.
JOHN S. FOSTER
BY
William D. Hall
ATTORNEY

April 29, 1958 J. S. FOSTER 2,832,936

ELECTROMAGNETIC ENERGY PHASE SHIFTING DEVICE

Filed March 26, 1946 6 Sheets-Sheet 6

INVENTOR
JOHN S. FOSTER
BY
William D. Hall
ATTORNEY

United States Patent Office 2,832,936
Patented Apr. 29, 1958

2,832,936

ELECTROMAGNETIC ENERGY PHASE SHIFTING DEVICE

John S. Foster, Montreal, Quebec, Canada, assignor, by mesne assignments, to the United States of America as represented by the Secretary of War Application March 26, 1946, Serial No. 657,156

26 Claims. (Cl. 333—31)

The present invention relates to phased electromagnetic energy and more particularly to means for phase shifting said energy in a predeterminable fashion.

In the art of object locating by means of radiant energy transmission, it is often desirable to scan a field of coverage, or a sector of space, in a sequential fashion so that the radiant electromagnetic energy covers each portion of the field. This is usually accomplished by directing the energy from the location of the source in a particular direction radially and moving the axis of the radiant energy through a desired angle. A sector of space is thus scanned by the radiant energy. Heretofore one way of accomplishing the scanning action has been to rotate or oscillate the entire antenna system to cover the scan angle in the desired manner, or to orient the axis of electromagnetic radiation along any predetermined direction. Among the undesirable features inherent in such a scheme for accomplishing scanning is the fact that if a sector is to be scanned repeatedly and frequently it is necessary in the usual scanning apparatus to oscillate the antenna. This usually requires a simple harmonic motion of the parts which, among other things, introduces difficulties in synchronizing an indicator with the precise angular position of the axis of the radiant energy. A preferable way to obtain the varying direction of the energy necessary to scan a sector of space is to accomplish the result by motion of some single member of the antenna apparatus rather than the motion of the entire antenna. Such scanning systems of the latter nature as have been devised in the past have certain inherent difficulties in distortion of the phased electromagnetic energy which are transmitted by the antenna system making it difficult to procure a highly directive beam when desired, and many of these latter systems also require the motion of massive parts. Although the present invention is generally susceptible of oscillation of a moving member to accomplish a scanning action over a desired sector of space, the major embodiments herein disclosed provide a rotating, rather than an oscillating motion for the moving member, to which corresponds a sweeping motion of the axis of the radiant energy through a sector of space, and the antenna structure per se may, if desired, be maintained stationary. Further, the present invention is capable of a variety of useful applications other than as a part of an antenna system of a radio object locating apparatus.

Accordingly, one of the objects of the present invention is to provide means for shifting the phase of a phase front of electromagnetic energy in controlled manner so that energy radiated from the system employed in the invention may be directed in a predetermined manner.

Another object of the present invention is to provide simple and efficient means for cyclically phase shifting electromagnetic energy of predetermined phasing.

Another object of the present invention is to provide means of the aforesaid character which is flexible and versatile in nature thereby readily to lend itself to many and varied useful applications.

Another object of the present invention is to provide means for scanning a sector of space with electromagnetic radiation in an improved and readily controllable manner.

Another object is to provide apparatus which will cyclically phase shift electromagnetic energy of predetermined phasing in a manner closely linear with time.

Another object of the present invention is to provide phase shifting apparatus of the aforementioned character which will readily accommodate electromagnetic radiation varying over a broad frequency band.

Another object of the present invention is to provide means for sweeping a beam of radiant energy over a predetermined sector of space at a high recurrence rate through the use of a continuously unidirectionally moving energy-guiding element thereby permitting the attainment of an exceptionally high scanning rate.

In general my invention provides means for changing the wave front direction of electromagnetic energy by directing the energy through a structure, usually a conical shell wave guide, by an amount which bears a predeterminable relationship to the angle of rotation of the means, usually the wave guide means. Continuous rotation of the conical shell wave guide member allows radiation of energy in such fashion that a definite field may be scanned thereby if desired.

Other objects will appear more fully from the following detailed description, accompanying drawings, and appended claims, in which—

Fig. 1 is a perspective view of one illustrative embodiment of the present invention;

Fig. 2 is an enlarged transverse cross-sectional view taken along 2—2 of Fig. 1, looking in the direction of the arrows;

Figures 15, 16, 17:
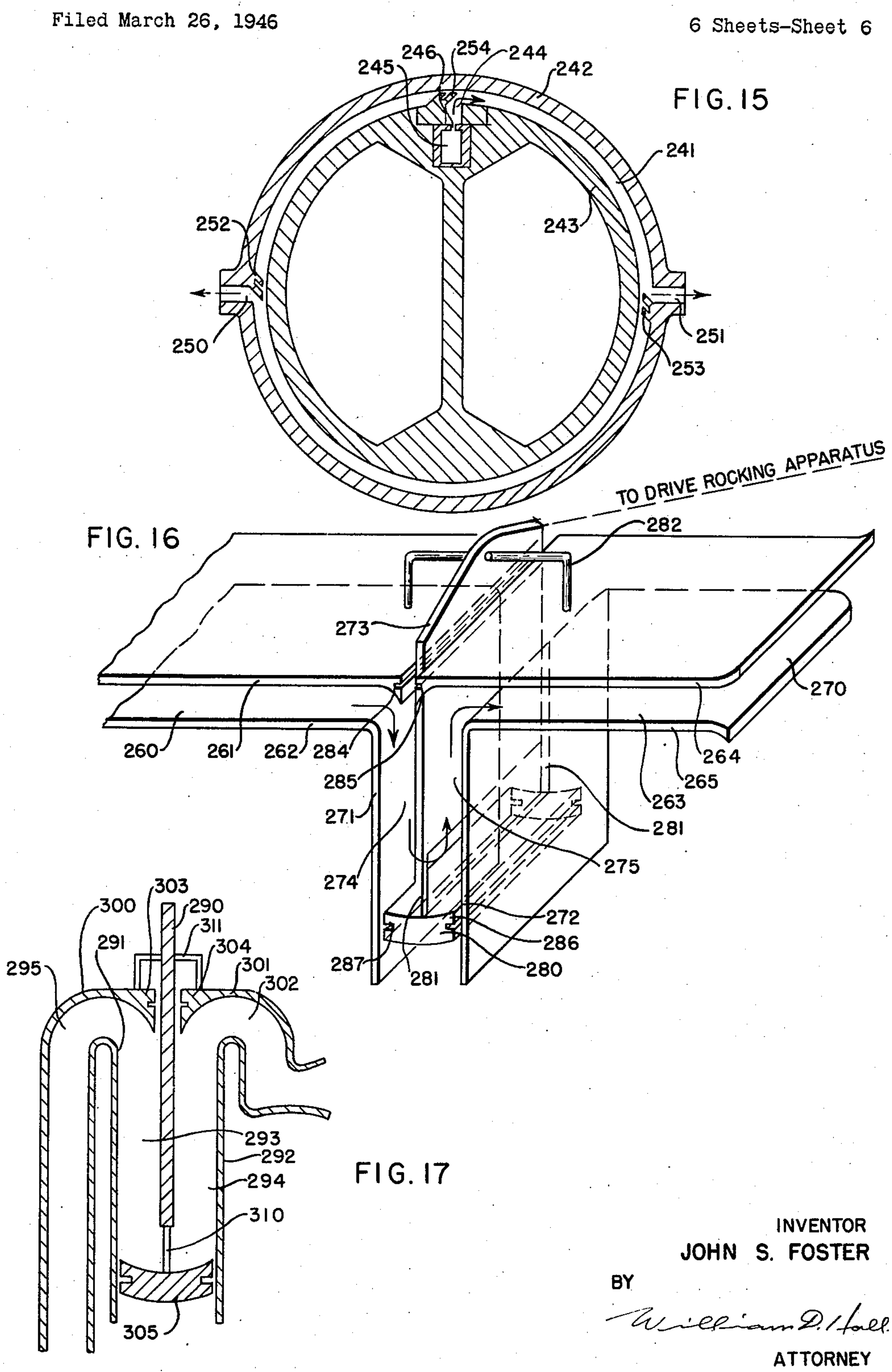
Fig. 15 is an enlarged transverse cross-sectional view through yet another related structure utilizing the principles of the present invention with energy feed means consisting of a wave guide feed array instead of a rolled-up pillbox.

Fig. 16 is an open perspective view of still another embodiment of the present invention wherein the energy is phase shifted by an oscillatory arcuately movable energy deflecting element as distinguished from the rotational energy-guiding conical elements shown in the preceding embodiments; and Fig. 17 is a transverse cross-sectional view through a compact modification of Fig. 16 wherein the energy guiding inlet and outlet means are folded down about the central phase-shifting portion to conserve space.

Referring now to Fig. 1 there is shown a perspective view of an illustrative embodiment of the invention, and in this figure a coaxial cable 20 terminates in a probe 21 which extends into a parabolic hollow pillbox 22. Pillbox 22 has a reflecting wall 23 affording an internal reflecting parabolic cylindrical surface so that energy falling upon the surface from excitation of probe 21 will be directed away from reflecting wall 23 in a direction parallel to side walls 24 of the pillbox. A lip 25, which may be formed as an extension of part of the external conductor of coaxial cable 20, is adapted to reflect energy from probe 21 toward reflecting wall 23 to assure that substantially all of the energy from the probe strikes the reflecting wall from substantially the focal line of the parabolic reflecting surface at which probe 21 and lip 25 are located. Top and bottom walls 26 and 27 of the pillbox are separated preferably by less than one-half wavelength at the operating frequency of the electromagnetic energy introduced by exciting probe 21. Thus the pillbox 22 may be described as having internal surfaces forming a right cylinder having a generatrix following a parabolic curve corresponding to the surface of reflecting wall 23 and parallel straight line sides corresponding to the internal surfaces of side walls 24. The cylinder is inclosed by plane surfaces of comparatively small separation corresponding to those afforded by top and bottom walls 26 and 27 and an open portion which communicates with a conical shell wave guide 28. Wave guide 28 will be more particularly described hereinafter.

A parallel plate wave guide 29 may be provided, also communicating with conical shell wave guide 28, and having an aperture 30 extending substantially normal to the axial plane of the parabolic reflecting surface of wall 23. Aperture 30 may be suitably flared to match outer space impedance.

Figure 3:
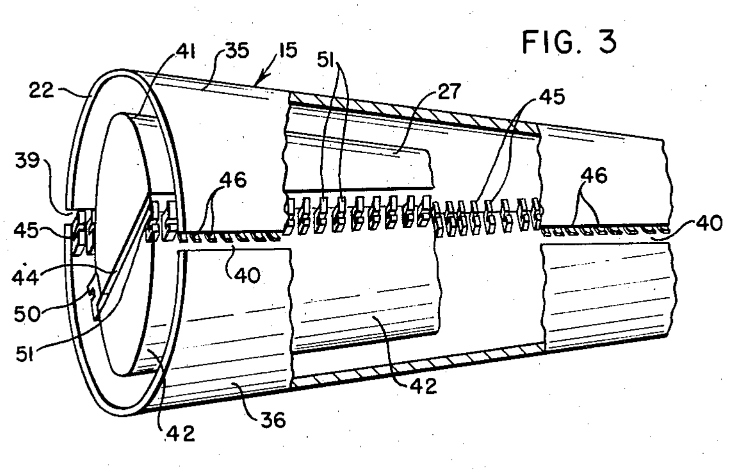
Fig. 3 is an enlarged fragmentary view in perspective of the conical portion of the structure shown in Fig. 1 with portions broken away to expose underlying details of construction.

Features of conical shell wave guide 28 will be more readily apparent by reference to Figs. 2 and 3 displaying respectively cross-sectional and fragmentary views thereof, as well as Fig. 1. The position of a rotor member in Fig. 3 is different, however, from that of the rotor in Fig. 2 to permit a clearer view of the internal structure. Conical shell wave guide 28 is formed of external stator members 35 and 36 affording respectively conductive surfaces 37 and 38 which, taken together, define a substantially conical truncated surface wherein are longitudinal apertures 39 and 40 providing communication with pillbox 22 and wave guide 29 respectively. Internal rotor members 41 and 42 afford conductive surfaces 41' and 42' respectively, which, taken together, again afford a substantially conical surface coaxial with surfaces 37 and 38. Thus rotor members 41 and 42 afford the internal conical wave guide surface, and stator members 35 and 36 afford the external wave guide surface of what is herein termed a conical shell wave guide 43. A longitudinal diametral slot is provided between rotor members 41 and 42 whereby an internal communicating passageway 44 is afforded between opposed sides of conical shell wave guide 28.

Sets of reflectors 45 and 46 extend into conical shell wave guide 28 from surfaces 37 and 38 respectively, and are placed just counter-clockwise of communicating apertures 39 and 40 as viewed in Fig. 2. Sets of reflectors 50 and 51 extend into conical shell wave guide 28 from members 41 and 42 respectively and are placed just counter-clockwise of diametral passageway 44 in Fig. 2.

Sets of reflectors 45, 46, 50 and 51 are preferably of the type disclosed and described in the copending application of G. J. Yevick, Serial No. 639,644, entitled Transmission Lines, and filed January 7, 1946, although simple finger-like metallic projections, or fingers, or even solid reflectors would serve. However, the slab-like teeth shown have given desirable results. The spacing between the teeth is preferably less than the width of a rectangular wave guide with a cutoff frequency greater than the highest contemplated operating frequency. Further, a slot in each tooth having a depth of about one-quarter wavelength, and a distance of about one-quarter wavelength from the slot to the reflecting face of the tooth along the gap between it and the opposing wave guide surface has proved efficient in operating models. Referring, for example, to Fig. 2, slot 51_a_ is about one-quarter wavelength long. Measured circumferentially, the distance _b_ is also about one-quarter wavelength. Therefore, in analogy to transmission line theory, the short-circuit impedance at the far end of slot 51_a_ is presented to electromagnetic energy incident near the point of tooth 51 and surface 38. In this manner there is an effective electrical short-circuit between conductive surfaces 38 and 42'. The shape of the tooth may be chosen to minimize reflections back toward any incident energy; for example, the teeth may be shaped as teeth 51 of Fig. 2 or, better yet, they may be shaped with a straight edge inclined at an angle to the wave guide surfaces to reflect incident energy from one wave guide into another without causing any appreciable reflected wave in a direction opposed to the incident energy, instead of the curved edge 51_c_ shown for teeth 51.

The operation of the structure may be described by following the passage of electromagnetic energy originating from excitation of probe 21. Substantially all of this energy is directed against parabolic reflecting wall 23 and upon reflection therefrom travels in pillbox 22 toward conical shell wave guide 28 with the electrical vectors normal to top and bottom walls 26 and 27 and with a phase front perpendicular to the axial plane of the parabolic reflecting surface. The energy passes through aperture 39 into conical shell wave guide 28 and, viewing the structure as shown in Fig. 2, is directed clockwise by reflecting teeth 45 through conical shell wave guide 28 toward reflecting teeth 51; thence the energy is directed by the set of reflecting teeth 51 through passageway 44 to reflecting teeth 50; and thence counter-clockwise through conical shell wave guide 28 to reflecting teeth 46 which in turn directs the energy through aperture 40 into wave guide 29, whence it is directed into outer space from aperture 30 of Fig. 1. Since energy passing through the conical shell wave guide follows different adjacent path lengths, it will suffer a phase shift dependent upon the position of rotor members 41 and 42 and the angle of the cone formed by the conical surfaces. If the rotor member is located in such a position that the plane of passageway 44 is substantially coincident with the line from aperture 39 to diametrically opposed aperture 40, there will be substantially no phase shift and the energy will be directed outwardly with a phase front parallel to aperture 30 and in a direction substantially perpendicular thereto. However, in a position of the rotor nearly 180° clockwise from the position of no phase shift and yet just prior to the time the teeth slip past each other, the energy will undergo a maximum phase shift so that it is directed from aperture 30 at some angle other than the perpendicular.

The resultant scanning of the radiant energy as it emanates from aperture 30 will be apparent from the arrowed lines displayed in Fig. 1 wherein arrows 52 indicate the direction in which energy may leave aperture 30 corresponding to an initial position of the rotor wherein the energy has received substantially no phase shift in its passage through conical shell wave guide 28 and therefore has a phase front parallel to aperture 30 along line 52'. As the rotor unit turns so that the energy receives a phase shift in passing through conical shell wave guide 28 the direction of the departure of energy from aperture 30 will vary continuously until it is emanating in the directions indicated by arrows 53 with a phase front along line 53'. Arrows 53 may define the extreme angle of departure of the energy, so that angle B represents the scan angle corresponding to a half cycle of rotation of the rotor unit, and on the beginning of the next half cycle the energy will again be directed along lines 52. Thus the scanning sector is covered by the energy scanning continuously through the angle B from lines 52 to lines 53 and then discretely returning to lines 52 whereupon the half cycle ends and successive half cycles correspondingly are repeated with continuous rotation of the rotor unit.

The arrangement displayed in the Figs. 1 and 2 is in the specific form shown for clarity of explanation. It will be quite apparent that many variations could be made, for example, by arranging the axial plane of the parabolic pillbox at some different angle to the axis of the conical shell wave guide 28, or other types of feed might be used to introduce energy to aperture 39.

Figure 4:
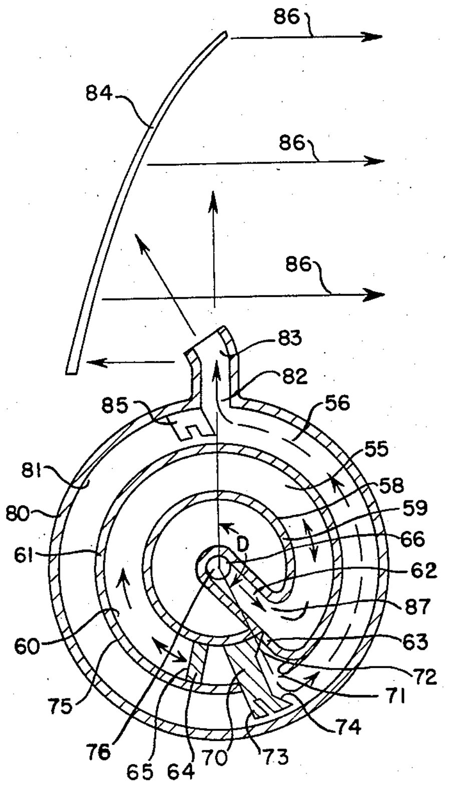
Fig. 4 represents a transverse cross-sectional view taken through a second alternative illustrative embodiment of the present invention, having the input pill-box feed portion rolled-up centrally within the conical portion of the apparatus, and showing a reflector operatively associated with the output portion of the apparatus.

Referring now to Fig. 4, there is illustrated a transverse cross-sectional view taken through another illustrative embodiment of the present invention, and in which a parabolic pillbox 55 is rolled-up and inserted centrally within a conical shell wave guide 56. Pillbox 55 may be described by comparison with the structure of pillbox 22 of Fig. 1. A pillbox such as 22 of Fig. 1 may be rolled-up as shown in Fig. 4, as pillbox 55, with the member 59 affording surface 58 corresponding to top member 26 of Fig. 1. Likewise, surface 60 is afforded by by a curved member 61 which corresponds to member 27 of Fig. 1. A feed wave guide 62 is provided in the embodiment illustrated by Fig. 4 which corresponds to the feed coaxial cable 20 of Fig. 1. A lip 63 of Fig. 4 corresponds to lip 25 of Fig. 1. Member 64 of this figure, affording a reflecting surface 65, corresponds to reflecting member 23 of Fig. 1. The members corresponding to members 26 and 27 of Fig. 1 would require some stretching or compressing to afford the shape provided in the structure of Fig. 4 to the pillbox 55, since preferably surfaces 58 and 60 remain parallel, with reflecting surface 65 normal thereto where it joins them. Energy is fed to feed wave guide 62 of the structure of this figure by a wave guide 66 extending axially from one end of the structure. Wave guide 66 is supplied with energy through a rotating joint, which for simplicity is not shown but such devices are common to the art, and are therefore well known.

Member 70 extends longitudinally along wave guide 55 near longitudinal aperture 71 which affords communication between pillbox 55 and conical shell wave guide 56. Member 70 has an edge 72 which extends at an angle with respect to member 60 along wave guide 55 to reflect or guide incident energy from within pillbox 55 through aperture 71. Reflecting member 70 is attached to member 59 just clockwise of aperture 71 and extends across pillbox 55 through the clockwise side of aperture 71. Reflecting teeth 73 may be formed integrally with member 50, and extend into wave guide 56. The reflecting teeth 73 are provided with reflecting edges 74 oriented in such wise that energy directed against them from aperture 71 is guided counter-clockwise into conical shell wave guide 56. Member 61, which affords surface 60 of pillbox 55, also affords surface 75 which serves as the internal surface of conical shell wave guide 56. Pillbox 55, together with wave guides 66 and 62, and reflecting member 70 form rotor members, and may be considered as a single rotor unit adapted to rotate about the axis 75 of conical shell wave guide 56. Stator member 80 affords surface 81 which serves as the external surface of the conical shell wave guide. Longitudinally of member 80 an aperture 82 is provided through which energy may pass to an adjunctive wave guide 83. Wave guide 83 may have sides suitably flared to direct energy against an external parabolic cylindrical reflector 84 associated with the structure. Attached to member 80 just counterclockwise of aperture 82 are energy guiding or reflecting teeth 85 which extend into conical shell wave guide 56 and are adapted to direct incident energy approaching teeth 85 which has been directed from teeth 73 into and through aperture 82. Reflecting teeth 73 and 85 are spaced to slip through each other to permit free movement of the rotor unit. Due to its parabolic shape and the location of wave guide 83 along the focal axis of the cylindrical reflector 84, energy directed outwardly therefrom travels in the direction indicated by arrows 86.

In explanation of the operation of the embodiment in Fig. 4, consider an incident wave of energy advancing from the rotating joint through wave guide 66. Upon reaching the junction of this guide, with wave guide 62, the incident energy is directed toward pillbox 55 and advances therein toward reflecting surface 65. Such of the energy as would tend to advance in an opposed direction is thrown back toward reflecting surface 65 by lip 63. Thus, substantially all of the incident energy is guided between surfaces 58 and 60 toward parabolic reflecting surface 65 as though it emanated substantially from a point source located near focal point 87. Surfaces 58 and 60 are preferably separated by less than one-half wavelength at the operating frequency of the device, and energy travel therebetween may be analyzed as though the energy flowed along a surface median to surfaces 58 and 60. Considered in this manner, it will be apparent from the original parabolic shape of reflecting surface 65 with point 87 on its focal line, that after reflection from the parabolic reflecting surface, the energy becomes an incident wave travelling clockwise along the hypothetical median surface toward reflecting member 70 with a straight line phase front. This straight line phase front energy is guided by member 70 and teeth 73 through aperture 71 into conical shell wave guide 56. The energy maintains its straight line phase front in passage through wave guide 56. However, immediately adjacent energy paths are of different lengths because of the conical shape of guiding surfaces 75 and 81, and as the energy emanates from wave guide 83 after passage through aperture 82, through which it is directed by reflecting teeth 85, the straight line phase front will have assumed a definite angular orientation relative to some fiducial line. The angle through which the phase front is shifted will depend upon the position of aperture 71 relative to aperture 82, that is upon the rotor position, and the cone angles of surfaces 75 and 81. The angle of the cones determines the maximum possible scan angle resulting from a 360° rotation of the rotor parts, and the rotor position determines at what angle within the maximum scan angle the energy is directed.

Figure 5:
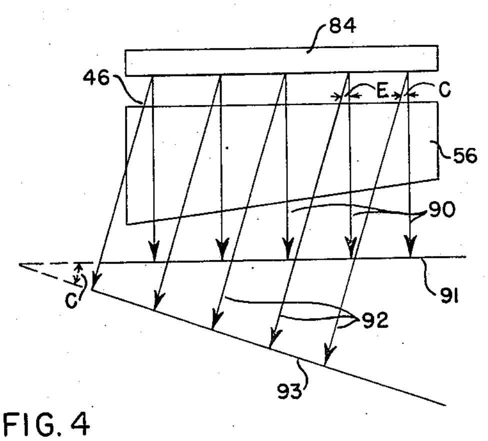
Fig. 5 is a diagrammatic representation of the wave fronts emanating from embodiment illustrated in Fig. 4.

Referring now to Fig. 5, as well as Fig. 4, arrows 90 and phase front 91 may indicate the direction of energy reflected from parabolic cylinder reflector 84 and corresponds to an initial position of the rotor parts wherein aperture 71 is immediately adjacent to aperture 82. With aperture 71 in a position nearly 360° from this initial position the direction of energy travel may be such as represented by arrows 92 and the straight line phase front thereof by line 93. Angle C then represents the maximuch scan angle, which may be calculated or estimated from simple geometrical considerations. Furthermore, the angle at which energy emanates relative to lines 90, is in direct proportion to the angle at which aperture 71 is rotated from aperture 32. Thus there is a linear relationship between the position of the rotor and the scan angle. If the rotor members of the structure of Fig. 4 are turned at a constant rate starting from the initial position hereinbefore described, the energy will scan at a uniform rate emanating first along lines 90 of Fig. 5, sweeping uniformly through angle C until it is emanating along lines 92, whereupon one cycle is completed, and the described cycle recurs again as the rotor members complete another cycle of rotation.

It will be understood that the cycle may be modified somewhat by the period of time during which the passage of energy through aperture 71 and aperture 82 is disturbed by their positions relative to teeth 85 and 73, and possibly also by the desirability of interrupting transmission when teeth 73 and teeth 85 are in close proximity to avoid arc-over.

Figure 7:
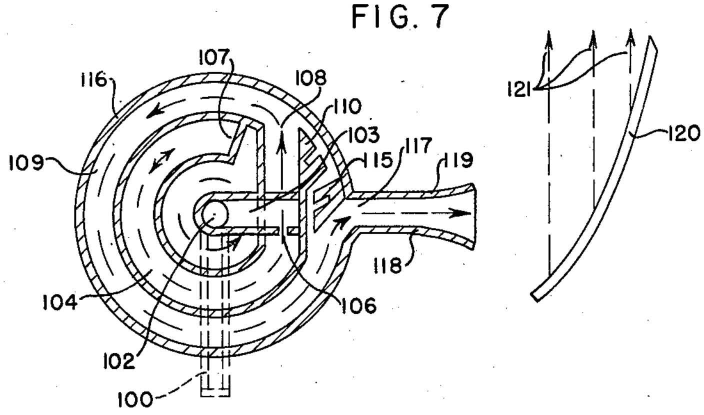
Fig. 7 is an enlarged transverse cross-sectional view taken along line 7—7 of Fig. 6, looking in the direction of the arrows.
Figure 6:
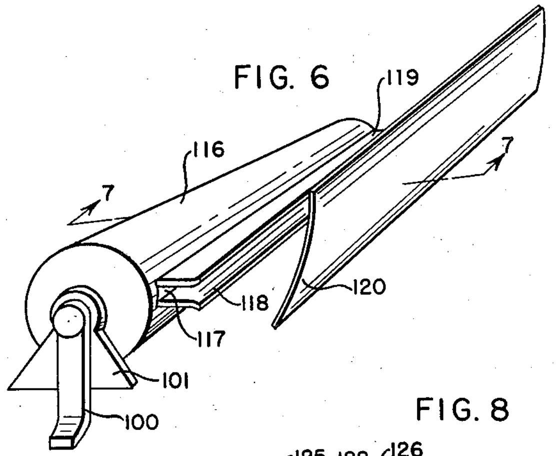
Fig. 6 is a perspective view of another illustrative embodiment of the present invention shown operatively associated with an external reflector.

Referring now to Figs. 6 and 7 wherein are displayed respectively a perspective view and enlarged transverse cross-sectional view of another illustrative embodiment of the present invention wherein like parts bear like reference numerals, wave guide 100 (shown in dotted lines in Fig. 7) is adapted to carry electromagnetic energy from some source (not shown) to the structure. A housing 101 (as shown in Fig. 6) is provided to accommodate the gears or other mechanical equipment necessary to impart motion to the rotor elements. A rotating joint is also included in the housing covering adapted to carry energy to wave guide 102 which is inserted axially from one end of the structure. The energy may be carried to wave guide 103 by a right-angle joint between the wave guide 102 and thence is emitted into rolled-up parabolic pillbox 104 near the focal point 106 thereof. The pillbox is similar in construction to the rolled-up parabolic pillbox already described in connection with Fig. 4. The energy after reflection from the parabolic reflecting surface 107 of pillbox 104 in Fig. 7 is directed through longitudinal aperture 108 into conical shell wave guide 109. A set of reflectors 110 extend into conical shell wave guide 109 to direct the energy counter-clockwise in this guide after passage thereof through aperture 108.

A second set of reflectors 115 extend into conical shell wave guide 109 from the outer member 116 thereof and are placed just counter-clockwise of longitudinal aperture 117 provided in member 116 for the passage of energy therethrough. Reflectors 110 and 115 are spaced to slip through each other. Aperture 117 may have its sides extended with suitably flared energy guiding portions 118 and 119 to illuminate an associated parabolic cylindrical reflector 120. Members 116 and reflector 115 are stationary, whereas the other parts contained within conical shell wave guide 109 constitute a rotor unit which is rotatable about the axial center of conical shell wave guide 109. As the rotor unit is turned at a uniform rate through a 360° cycle, the energy reflected from associated reflector 120 scans linearly with time through an angle determined by the angle of the cone of the conical shell wave guide 109 in a plane perpendicular to the view in Fig. 7.

Comparing the two embodiments as shown in cross-sectional views in Figs. 4 and 7, it will be observed that one less reflection of the electromagnetic energy is required in the latter embodiment as the energy is directed from the rolled-up parabolic pillbox through the communicating aperture into the conical shell wave guide.

Figures 8, 9:
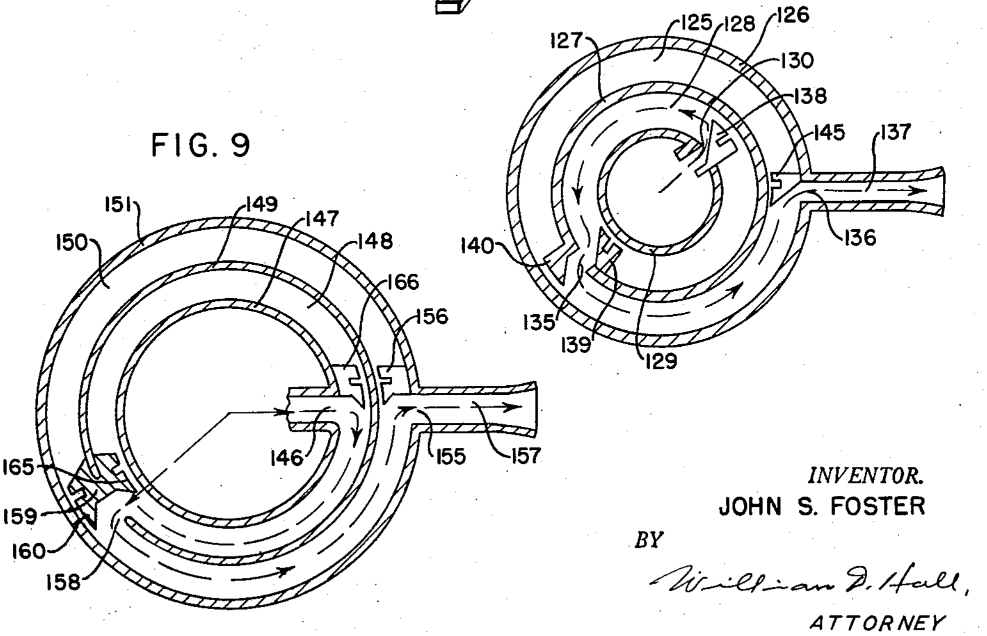
Fig. 8 represents a transverse cross-sectional view through yet another illustrative embodiment of the present invention wherein two separate relatively movable conical wave guide portions are provided.
Fig. 9 represents a transverse cross-sectional view taken through an alternative structure utilizing the principles of the present invention.

Referring now to Fig. 8 there is illustrated a transverse cross-sectional view through yet another illustrative embodiment of the present invention wherein two separate relatively movable conical shell wave guide portions are provided. For the sake of simplicity and clarity in the explanation the means for introducing energy to the conical shell wave guide, which may be such as the rolled-up parabolic pillbox and centrally inserted wave guide described in connection with the two embodiments illustrated by Figs. 4 and 7, are omitted from the view in Fig. 8. Illustrated in Fig. 8 is a conical shell wave guide 125 having conical surfaces defined by outer and inner members 126 and 127 respectively. A second conical shell wave guide 128 is disposed within, and coaxially with, the first conical shell wave guide 125. Conical shell wave guide 128 is defined by members 127 and 129. Thus, member 127 serves to define the inner surface of outer conical shell wave guide 125 and the outer surface of the inner conical shell wave guide 128. Outer member 126 is stationary, whereas inner member 129 and intermediate member 127 may be separately rotatable about the axis of the conical shell wave guides 125 and 128. A longitudinal aperture 130 is provided in member 129 affording communication between the energy inlet means (not shown) and wave guide 128. A longitudinal aperture 135 is provided in member 127 affording communication between conical shell wave guides 125 and 128. A longitudinal aperture 136 is provided in member 126 affording communication between conical shell wave guide 125 and an energy outlet wave guide 137 which may be suitably flared or shaped to direct the energy into outer space or to illuminate a reflector (not shown).

Sets of reflectors are associated with the conical shell wave guide members to guide the energy in the desired path through the conical shell wave guides from where it enters wave guide 128 through aperture 130 to where it leaves wave guide 125 through aperture 126. Thus, reflectors 138, which are attached to member 129 just clockwise of aperture 130, as viewed in Fig. 8, extend into wave guide 128. Reflectors 139 are attached to member 127 just counter-clockwise of aperture 135 and also extend into wave guide 128. Reflectors 140 and 145, which are attached respectively to member 127 just counter-clockwise of aperture 135 and to member 126 just counter-clockwise of aperture 136, extend into wave guide 125. Sets of reflectors 138, 139, 140 and 145 are constructed similarly to the reflectors hereinbefore described; and reflectors 138 are adapted to slip through reflectors 139 and likewise reflectors 140 are adapted to slip through reflectors 145.

The effect of the structure illustrated in Fig. 8 is to make possible an angle of scan twice that which might be realized by the embodiments hereinbefore described, assuming the cone angles of all the conical surfaces to be the same. The scan angle which may be achieved in the embodiment of Fig. 8 is dependent upon the cone angle of each conical shell wave guide, and is a linear function of an angle of rotation of each of the separate rotating elements.

Referring now to Fig. 9, there is illustrated an alternative structure involving two separate relatively movable wave guide portions. The energy inlet means adapted to introduce a defined phase front through a longitudinal aperture 146 in member 147 forming the inner surface of inner conical shell wave guide 148 is omitted for purposes of clarity. Intermediate member 149 defines the outer surface of inner conical shell wave guide 148 and the inner surface of outer conical shell wave guide 150. Member 151 defines the outer surface of outer conical shell wave guide 150. Conical shell wave guides 148 and 150 are disposed coaxially, and inner member 147 with the associated energy inlet means is rotatable about the common axis, while member 149 is separately rotatable thereabout. Member 151 is stationary. Longitudinal aperture 155 is provided in member 151 for energy-outlet purposes and a set of reflectors 156 are attached to member 151 extending into conical shell wave guide 150 so that incident energy approaching the teeth counter-clockwise is directed through aperture 155 into wave guide 157 which may be suitably flared to direct the outgoing energy in any desired manner. Aperture 158 is provided in member 149 to afford communication between wave guides 148 and 150. Reflectors 159 are joined to member 149 just clockwise of aperture 158 and has reflecting portions 160 and 165 which extend respectively into wave guides 150 and 148 so that incident energy approaching reflectors 159 in a clockwise direction in conical shell wave guide 148 is directed through aperture 158 into conical shell wave guide 150 in a clockwise direction therein. Reflectors 166 are attached to member 147 just counter-clockwise of apertures 146 and extend into wave guide 148.

Thus, as viewed in Fig. 9, the energy entering through aperture 146 is directed by reflectors 166 clockwise through conical shell wave guide 148 to reflectors 159 which guide the energy through aperture 158 and direct it in a counter-clockwise direction through conical shell wave guide 150 to reflectors 156, which, in turn, direct it outwardly through aperture 155 and adjunctive wave guide 157. Inner member 147 and intermediate member 149 are separately rotatable about the common axis of coaxially disposed conical shell wave guides 148 and 150. Reflectors 159 are so adapted that reflecting portions 160 and 165 respectively slip through reflectors 156 and 166, permitting free rotation of rotor members. This structure affords a like advantage in the scan angle which may be achieved by the embodiment illustrated in Fig. 8. If desired, in the structure of Fig. 9, inner member 147 may be held stationary, obviating the necessity of utilizing a rotating joint and intermediate member 149 only may be rotated. A similar arrangement is possible in the embodiment of Fig. 8.

Figure 10:
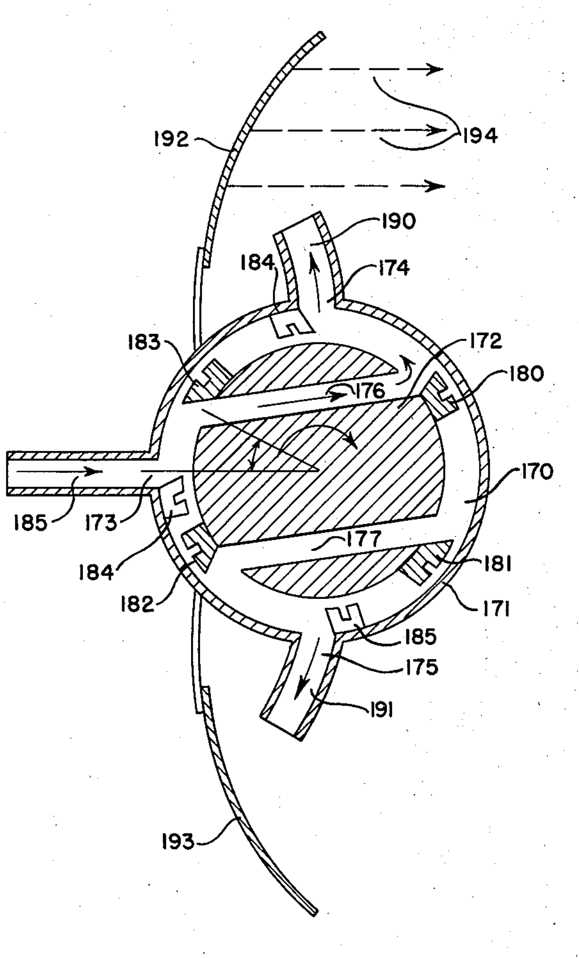
Fig. 10 is a transverse cross-sectional view through still another embodiment of the present invention wherein two outlet portions are provided operatively associated with two separate external reflectors to provide two separate operating beams of radiant energy.

Referring now to Fig. 10, there is illustrated another embodiment of the present invention wherein two energy outlet portions are provided operatively associated with two separate external reflectors whereby two separate beams of energy may be radiated. In this embodiment, a conical shell wave guide 170 may be formed by an outer stationary member 171 and an inner rotor member 172. Member 171 contains a longitudinal energy inlet aperture 173 and two diametrically opposed longitudinal energy outlet apertures 174 and 175. Inner member 172 has two slot-like openings 176 and 177 which constitute substantially parallel plate wave guides for the transmission of energy from different portions in the conical shell wave guide 170. The wave guides 176 and 177 have their respective plane surfaces disposed at substantially the same angle to each other as the angle of the cone of the conical shell wave guide 170; they are symmetrically placed so that the communicating openings between conical shell wave guide 170 and parallel plate wave guides 176 and 177 are at substantially 90° intervals. Sets of reflectors 180, 181, 182 and 183 are attached to rotor member 172 just clockwise of each communicating aperture 176 and 177 and extend into wave guide 170. Sets of reflectors 184 and 185, likewise extending into conical shell wave guide 170, are attached to stationary member 171 immediately counter-clockwise of energy outlet apertures 174 and 175 respectively. A set of reflectors 184 is also attached to member 171 extending into wave guide 170 and located immediately counter-clockwise of energy inlet aperture 173. Energy inlet means (not shown) may be adapted to introduce energy into adjunctive wave guide 185 from which it will enter conical shell wave guide 170 through aperture 173. Energy outlet wave guides 190 and 191 are adapted to carry the energy from outlet apertures 174 and 175 respectively and direct it in proper manner against parabolic reflectors 192 and 193 respectively from which the energy may be directed into outer space.

In the position of rotor member 172, shown in Fig. 10, as energy is directed through wave guide 185 and aperture 173, it is guided by reflector 184 clockwise through conical shell wave guide 170 to reflector 183, thence through wave guide 176 to reflector 180, thence counter-clockwise through wave guide 170 to reflector 184 and thence through aperture 174 and adjunctive wave guide 190 to parabolic cylinder reflector 192, from which it is radiated into outer space as shown by the arrows 194. Assuming a cycle to start about the time that reflectors 180 and 184 are close together, permitting energy entering from aperture 173 to pass practically directly through wave guides 176 to aperture 174, however, a cycle of operation may be described assuming the rotor member to turn clockwise about the axis of conical shell wave guide 170. As rotation progresses, the energy reflected from parabolic cylinder reflector 192 undergoes a continuously increasing phase shift varying linearly with the rotation of the rotor member. After a 90° rotation, reflector 182 will pass through, or slip by, the reflector 184, and energy will then be directed from aperture 172 almost directly through wave guide 177 to aperture 175 so that parabolic cylinder reflector 193 is illuminated with radiant energy. No energy will then be directed against reflector 192. As rotor member 172 continues to turn through another 90°, the energy directed from reflector 193 will undergo a continuous phase shift until the rotor has completed substantially 180° rotation from the initial position whereupon a half cycle, similar to the previously described half cycle, will be completed through the next 180° rotation of the rotor member 172. During each successive half cycle, each reflector 192 and 193 is illuminated successively during one quarter of the cycle.

Figure 11:
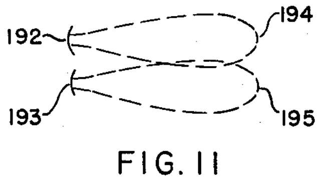
Fig. 11 is a side elevational view illustrating the beam patterns reflected from the two reflectors of the embodiment illustrated in Fig. 10.

Referring now to Fig. 11, the radiation pattern from each reflector 192 and 193 may be substantially such as illustrated in dotted lines 194 and 195.

Figure 12:
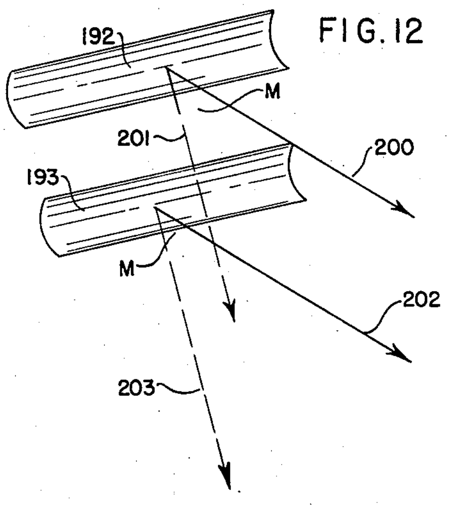
Fig. 12 is a simplified schematic view in perspective showing the scan angles swept by the axes of the beams illustrated in Fig. 11.

Referring now to Fig. 12, reflectors 192 and 193 are viewed in perspective in a diagrammatical illustration of the manner in which the axis of radiation scans as it emanates from each of two reflectors. Assuming a cycle such as described in connection with the rotation of the rotor member 172 of Fig. 10, the energy may first be directed outwardly if it has a substantially straight line phase front, with its axis along line 200 of Fig. 12. As rotor 172 of Fig. 10 turns at a uniform rate, the axis of energy leaving reflector 192 will change uniformly through a scan angle M until it emanates in the direction indicated by dotted lines 201, which may represent the extreme position of the axis of radiation. A quarter cycle of operation will then be completed and energy will be reflected from reflector 193 with its axis along line 202 and, as the cycle progresses, will sweep through a scan angle M′ equal to M. The energy then is directed from reflector 193 with its axis along dotted line 203. A half cycle of operation will then be completed and a similar half cycle will commence in which energy will be directed from reflector 192 along line 200, etc., the second half cycle substantially duplicating the operation of the first half cycle.

The data obtained from a system employing the structure of Fig. 10 and the operation thereof, as illustrated in Figs. 11 and 12, may be particularly well adapted for tracking by lobe switching, or in other ways more or less conventional to the radio object locating art.

Figures 13, 14:
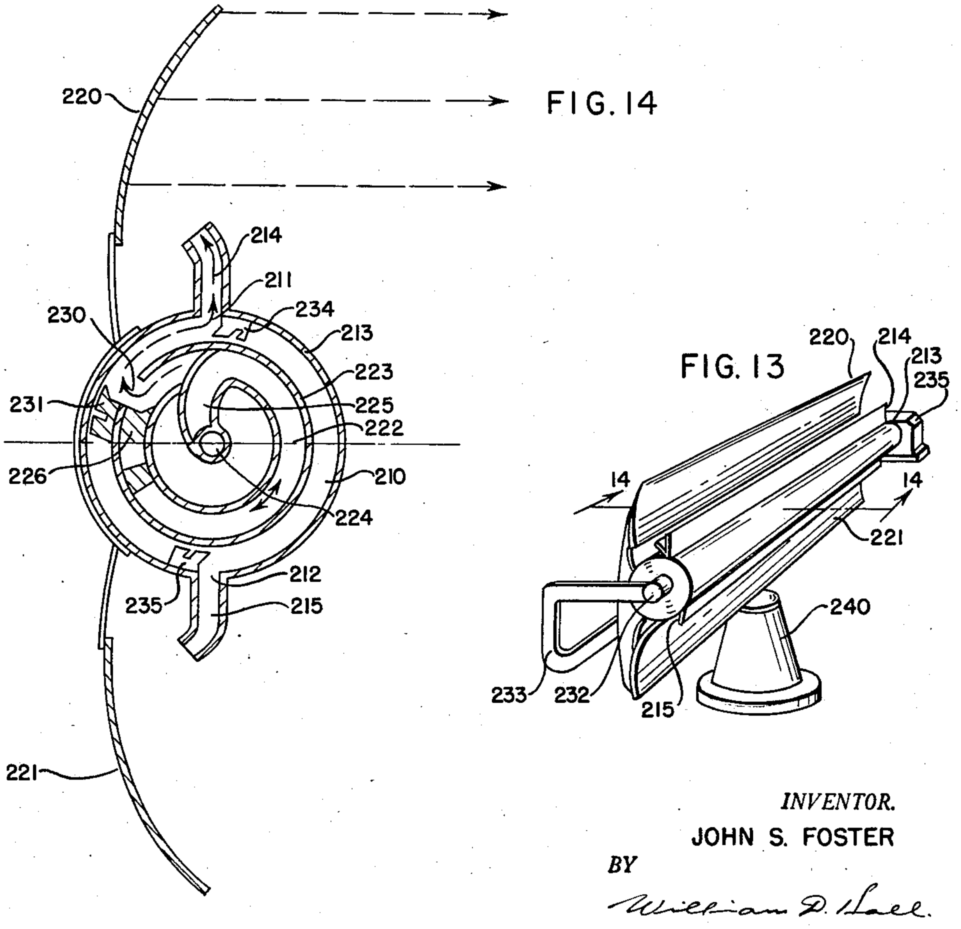
Fig. 13 is a perspective view of another illustrative embodiment of the present invention shown operatively associated with a pair of external reflectors.
Fig. 14 is an enlarged transverse cross-sectional view taken along the line 14—14 of Fig. 13 looking in the direction of the arrows, and showing the input pillbox feed portion rolled-up centrally within the conical portion of the apparatus.

Referring now to Figs. 13 and 14 showing respectively a perspective view and an enlarged transverse cross-sectional view of another illustrative embodiment of the present invention, conical shell wave guide 210 has two longitudinal energy outlet apertures 211 and 212 diametrically opposed in outer member 213. Apertures 211 and 212 provide communication between conical shell wave guide 210 and adjunctive wave guides 214 and 215 respectively, the latter being adapted to illuminate parabolic cylinder reflectors 220 and 221 respectively. Rolled-up parabolic pillbox 222 is inserted centrally of conical shell wave guide 210. The outer member 223 thereof may be common to conical shell wave guide 210 and serve as the inner member of the latter. Feed wave guide 224 is inserted axially from one end of conical shell wave guide 210 and joins wave guide 225 which is adapted to communicate with pillbox 222 and provide energy to the pillbox from the neighborhood of its focal point. Energy guiding member 226 is adapted to direct energy from pillbox 222 through longitudinal aperture 230 in member 223, which provides communication between pillbox 222 and conical shell wave guide 210. Reflecting teeth 231 may be formed integrally with member 226 and extend from member 223 into conical shell wave guide 210 at a position just counter-clockwise of aperture 230 as viewed in Fig. 14. Feed wave guide 224 may be supplied with energy by rotating joint 232 and wave guide 233, as illustrated in Fig. 13, the latter extending to a source not shown. Sets of reflecting teeth 234 and 235, adapted to permit reflecting teeth 231 to slip therethrough, are attached to member 213 just clockwise of apertures 211 and 212, respectively. Pillbox 222, member 223, wave guide 224, and member 226 rotate as an integral rotor unit. Gear box 235 may house the necessary mechanism and gears to turn the rotor unit as desired. The entire structure may be mounted on a suitable pedestal 240, which may contain means for orienting the structure as desired in azimuth and elevation.

The operation of the embodiment of Figs. 13 and 14 is apparent from the description of the embodiments previously described herein. Energy may be directed into wave guide 233 from the source thereof to rotating joint 232 and thence through wave guides 224 and 225 into pillbox 222. The energy is directed then from pillbox 222 through aperture 230 by the action of reflecting member 226 and is further directed by reflecting teeth 231 in a clockwise direction through conical shell wave guide 210. If the rotor unit is turned at a constant rate, it will be apparent that each of reflectors 220 and 221 will be illuminated for a half cycle of rotation and provide an intensity pattern similar to that shown in Fig. 11 for the embodiment of Fig. 10, and the energy will scan in a manner similar to that illustrated by Fig. 12.

Therefore, the embodiment of Fig. 13, would also be well adapted to employment in a radio object locating system for accurate determination of the vertical angular displacement of targets by suitably adjusting the mechanical position of the pedestal on the structure 240 to secure equal return signals from the lobes, and simultaneous determination of the azimuthal angular displacement of a target by orienting the structure on pedestal 240 in azimuth until the target falls within the scan angle and suitably correlating the return signal with the angular displacement of the rotor unit by means known in the radio object locating art.

Referring now to Fig. 15, showing an enlarged transverse cross-sectional view through an illustrative structure utilizing the principals of the present invention, a conical shell wave guide 241 having an outer member 242 and an inner member 243 is provided. Inner member 243 has a longitudinal energy-inlet aperture 244. Wave guide 245 is inserted in member 243 extending longitudinally. Wave guide 245 is of the type sometimes termed in the art as "a leaky wave guide," as it has along one side thereof an aperture 246 adapted to permit the leakage of electromagnetic energy therethrough.

As is known in the art, the aperture 246 in wave guide 245 may be adapted to transmit energy having a desired phase front. Many other types of wave guide or wave guide feed arrays might be used in place of the particular arrangement shown which permits the energy to emanate from wave guide 245 through aperture 246. For example, an array such as that described in the copending application of Edward M. Purcell, Serial No. 608,297, entitled "Antenna," and filed August 1, 1945, now Patent No. 2,703,841, issued March 8, 1955, might be used. Two longitudinal energy outlet apertures 250 and 251 respectively, diametrically opposed, are provided in outer member 242. The operation of this embodiment will then be similar to that of the embodiment described in connection with Figs. 13 and 14, although no associated reflectors are displayed in the illustration of Fig. 15 for purposes of simplicity. The energy may be introduced to wave guide 245 from one end or centrally thereof by having a suitable rotating joint at one end of conical shell wave guide 241, and the energy carried axially and then radially by a feed wave guide arrangement (not shown) to the place in wave guide 245 which will provide suitable energy feed thereto. Appropriate sets of reflectors 252 and 253 extend from outer member 242 into conical shell wave guide 241 just clockwise of apertures 250 and 251 respectively. A set of reflectors 254 extends from inner member 243 into conical shell wave guide 241 just counter-clockwise of aperture 244. The inner structure is rotatable about the axis of conical shell wave guide 241 in the same manner as previous embodiments, and teeth 254 are adapted to slip between teeth 252 and 253 to permit free movement of the rotor unit. Thus, the energy is directed clockwise through conical shell wave guide 241 by reflecting teeth 254 after emanation from aperture 244 and thence passes out of the first energy outlet aperture 250 or 251 to which it is directed in accordance with the position of the rotor unit, and undergoes a phase front displacement corresponding to the angular distance of travel through conical shell wave guide 241.

Referring now to Fig. 16 illustrating another embodiment of the present invention, an energy inlet parallel plate wave guide 260, horizontally disposed, is formed of members 261 and 262. Another horizontally disposed parallel plate wave guide 263 for energy outlet is formed of members 264 and 265 and is provided with a suitably flared aperture 270 to radiate the energy into outer space or to illuminate a reflecting surface as may be desired. Members 262 and 264 are extended into opposed vertical members 271 and 272 respectively. A vertical rocking member 273 is inserted between members 261 and 264 with just sufficient clearance to allow its motion and extends further to form parallel plate wave guides 274 and 275 by cooperation with the opposed surfaces of members 271 and 272 respectively. A reflecting member 280 is suspended from member 273 by means such as bars 281 which allow a space between members 273 and 280 through which electromagnetic energy may pass. Member 273 is pivoted on a bar 282 so that it may be rocked or rotated about a pin support 282 by any suitable mechanical device (indicated but not shown). Members 261 and 264 have terminations 284 and 285 respectively adjacent rocking member 273 with choke slots, as shown, to prevent the passage of energy, and arranged with reflector surfaces so that incident energy approaching member 273 through wave guide 260 is reflected into wave guide 274, and so that incident energy approaching member 264 through wave guide 275 will be directed into wave guide 263. Reflecting member 280 is shaped to direct energy approaching it by way of wave guide 274 through the communication passage between members 280 and 273, into wave guide 275. Choke slot terminations 286 and 287 may likewise be included laterally of member 280 to prevent the leakage or escape of energy between member 280 and members 271 and 272.

Asssuming that the straight line phase front of electromagnetic energy is directed into parallel plate wave guide 260 by appropriate means (not shown), this incident energy will then travel into wave guide 274 and adjacent path lengths of the energy will be changed by an amount depending on the angular displacement of rocking member 273 and, after passage into wave guide 275, will be directed from wave guide 263 through aperture 270 into outer space. The angle at which the energy will scan will vary in linear fashion with the angular displacement of rocking member 273.

Referring now to Fig. 17, there is illustrated a transverse cross-sectional view of a modification of the embodiment illustrated by Fig. 16 which is more compact than the latter. Rocking member 290 is inserted between opposed members 291 and 292 to form wave guides 293 and 294 respectively. Member 291 is folded or bent over so that a wave guide 295 is formed between member 291 and outer member 300. Member 292 is also folded to form with outer member 301 energy outlet wave guide 302 having an aperture suitably flared for directing the energy against a reflector or into open space as may be desired. Members 300 and 301 have choke terminations 303 and 304 adapted to prevent the escaping of energy between these members and rocking member 290. Reflecting member 305 is attached in spaced relation to rocking member 290 by bars 310, and choke slots, as shown, are cut laterally in reflecting member 305 to prevent the escape of energy between member 305 and members 291 and 292. In a manner similar to the embodiment of Fig. 16, the embodiment of Fig. 17 has rocking member 290 supported by a pin 311 permitting it to receive angular displacement in a vertical plane as viewed in the drawings. Energy directed into energy inlet wave guide 295 will be guided into wave guide 293 by the configuration of members 291 and 300, and then will be guided through the space between rocking member 290 and reflecting member 305 by curved reflecting surface presented to the energy by reflecting member 305. Communication is thus achieved between wave guides 293 and 294 and the energy passes through wave guide 294 into wave guide 302 and leaves the aperture provided for its emanation. The energy thus will scan through an angle which varies linearly with the angular displacement of rocking member 290.

It will be apparent to those skilled in the art that the present invention is susceptible of a number of variations and a variety of useful applications. For example, it may be mentioned in particular that other energy inlet means may be provided than those chosen to be herein illustrated. Both wave guide and dipole arrangements of various kinds may be used. It will be further apparent that it is not necessary, and may not be desirable, in some specified employments of the invention to utilize the ordinary straight line phase front. Rather, it may be desirable to utilize a beam having a different focal length or having a somewhat out-of-the-ordinary radiation pattern. The orientation of the phase front, as it leaves the energy inlet means, may be altered to suit the particular needs of the system or apparatus in which the invention is employed.

A further important feature which will be apparent to those skilled in the art of wave guides and ultra-high frequency radiation is that the elements of the invention constitute linear passive network, or the equivalent thereof. Consequently, although the invention has been described as suited for the transmission of electromagnetic energy, it may equally well be utilized for the reception thereof with like directive properties.

The invention should not, therefore, be restricted to the specific embodiments herein illustrated and described, but it is intended to include all of the many variations and equivalents that fall fairly within the spirit and scope of the hereinafter appended claims.

What is claimed is:

1. A wave guide for electromagnetic wave energy comprising inner and outer members having conical surfaces, the conical surface of one member being opposed to and spaced from the conical surface of the other member to form a wave guide space therebetween one of said members being operable to rotate the conical surface thereof relative to the conical surface of the other member, a reflector means on each member extending into said wave guide space to reflect energy propagated therein, and energy transfer means in said wave guide at a point intermediate said reflector means for transferring energy into and out of said guide, whereby on rotation of said rotatable member the distance between said reflector means is varied, thereby varying the effective path of the energy in the wave guide.

2. A wave guide as set forth in claim 1, wherein each reflector means comprises a plurality of teeth, the teeth of one reflector means being staggered relative to the teeth of the other reflector means, whereby one reflector means can be moved past the other.

3. Electromagnetic energy wave guide means including energy inlet and energy outlet means defining an energy path having a given width, and rotational variable path-length-determining means within said wave guide and intermediate the energy inlet and energy outlet means establishing a path for said energy of a length depending upon the position of said rotational means and the respective location of the path along the said width.

4. Wave guide means including energy inlet and energy outlet means, and rotationally movable cyclically operable means within said wave guide means and between said energy inlet and energy outlet means establishing adjacent energy paths of different lengths of which the instantaneous difference varies continuously over at least a portion of each cycle thereby cyclically to shift the wave front of said energy within said wave guide means.

5. An electromagnetic wave translating device comprising a pair of spaced metallic conductors forming a wave guide therebetween having a length dimension and a width dimension, one dimension of each of said surfaces being constant and the other dimension being tapered, whereby different portions of the wave front of energy traveling along said wave guide are delayed by different amounts, and means to simultaneously vary said amounts at different rates.

6. A device according to claim 5, wherein said means comprises means for moving one of said conductors relative to the other.

7. A device according to claim 6, wherein said conductors are conical.

8. A device according to claim 7, wherein said conductors have a common axis.

9. A device according to claim 8, wherein one of said conductors is mounted for rotation on said axis.

10. A wave translating device comprising at least a pair of conical conductors, one located within the other and forming a conical wave guide space therebetween, each conductor having at least one longitudinal slot therein for passage of wave energy to or from said wave guide space, one of said conductors being rotatable relative to the other, whereby the length of the path of travel of wave energy through said wave guide space from one slot to the other may be varied.

11. A wave translating device according to claim 10, wherein said conductors are coaxial.

12. A wave translating device according to claim 11, including reflector means at the border of at least one slot to confine the transmission of energy through said wave guide space to one direction between said slots.

13. A device according to claim 11, including a reflector means at one border of one slot and a reflector means at the opposite border of the other slot, both of said reflector means being oriented to substantially confine transmission of energy between said slots along only one half of said conical wave guide space.

14. A device according to claim 13, wherein each of said reflector means comprises a plurality of spaced teeth having reflecting edges, the teeth of one reflector means being staggered relative to the teeth of said reflector means, whereby one set of teeth can move past the other set without interference.

15. A device according to claim 14, wherein each tooth has a slot substantially a quarter wavelength deep situated substantially a quarter wavelength from the reflecting edge of the tooth.

16. A device according to claim 15, including a first energy transmission means coupled to the slot in the inner cone to supply energy thereto, and a second transmission means at the slot in the outer cone.

17. A device according to claim 16, wherein said first transmission means comprises a folded pillbox reflector situated within the inner cone.

18. A device according to claim 16, wherein said second means comprises a pair of spaced lips, one edge of each lip being fastened on opposite sides of the slot, and the opposite edges of said lips forming an aperture for radiation of wave energy therefrom.

19. An antenna comprising a pair of concentrically disposed conical conductors, the space therebetween forming a wave guide, the outer conductor having at least a pair of circumferentially spaced longitudinal slots therein, a source of wave energy including a pillbox radiator having a pair of parallel sides attached to one of said slots for feeding energy therethrough, the other slot being open for radiation of energy from said waveguide into space, the inner conductor having at least one slot therethrough for transmission of energy, reflecting means situated at the borders of said slots for guiding energy in one direction between said slots and through said wave guide, and means to rotate the inner conductor relative to the outer conductor thereby to cause spatial scanning of the radiated energy.

20. An antenna according to claim 19, wherein said pair of slots are aligned along a diametral plane of the conductors.

21. A wave translating device as set forth in claim 10, including an additional conical conductor concentric with and forming with one of said pair of conductors a second wave guide space, and means for electrically coupling the two wave guide spaces together.

22. A wave translating device as set forth in claim 21, wherein the last named means is a slot in said one of said pair of conductors.

23. An electromagnetic wave translating device comprising a pair of spaced conductors defining surfaces forming therebetween a wave guide, a wave reflector fixed to each of said conductors and extending into said wave guide toward the other conductor to an extent sufficient to substantially block the flow of energy past the reflecting surfaces of the reflectors, and means to move one of said conductors relative to the other to vary the distance between the reflectors and thus vary the effective length of said wave guide, the surface of one reflector being offset relative to that of the other, whereby one reflector may be moved past the other, and wave energy transfer means in said wave guide in the region between said reflectors for transferring energy into and out of said wave guide.

24. A wave translating device as set forth in claim 23, wherein each reflector comprises spaced teeth, the teeth of one reflector being staggered relative to the teeth of the other.

25. A wave translating device as set forth in claim 23, wherein one of said conductors is mounted for rotation relative to the other and wherein each of said reflectors extend in a direction having a component which is radial with respect to the axis of said rotation.

26. A wave translating device as set forth in claim 25, wherein said conductors are in the form of concentric cones and said reflectors extend along elements of said cones.

References Cited in the file of this patent

UNITED STATES PATENTS

| | | |
|---|---|---|
| 2,281,552 | Barrow | May 5, 1942 |
| 2,297,202 | Dallenbach et al. | Sept. 29, 1942 |
| 2,404,399 | Pickles | July 23, 1946 |
| 2,418,809 | Albersheim | Apr. 15, 1947 |
| 2,423,073 | Willoughby | June 24, 1947 |
| 2,442,951 | Iams | June 8, 1948 |
| 2,446,863 | Yevick | Aug. 10, 1948 |
| 2,504,333 | Iams | Apr. 18, 1950 |
| 2,521,844 | Gordy | Sept. 12, 1950 |
| 2,531,455 | Barrow | Nov. 28, 1950 |
| 2,594,409 | Feldman | Apr. 29, 1952 |